United States Patent
Wu et al.

(10) Patent No.: US 9,632,804 B2
(45) Date of Patent: Apr. 25, 2017

(54) METHOD, APPARATUS, AND COMMUNICATION SYSTEM FOR IMPLEMENTING INTERNET APPLICATION

(71) Applicant: TENCENT TECHNOLOGY (SHENZHEN) COMPANY LIMITED, Shenzhen (CN)

(72) Inventors: Jian Wu, Shenzhen (CN); Gaoqian Xu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 442 days.

(21) Appl. No.: 14/221,672

(22) Filed: Mar. 21, 2014

(65) Prior Publication Data

US 2014/0208309 A1 Jul. 24, 2014

Related U.S. Application Data

(63) Continuation of application No. PCT/CN2013/087225, filed on Nov. 15, 2013.

(30) Foreign Application Priority Data

Jan. 24, 2013 (CN) .......................... 2013 1 0027463

(51) Int. Cl.
*G06F 9/445* (2006.01)
(52) U.S. Cl.
CPC ................ *G06F 9/44505* (2013.01)
(58) Field of Classification Search
None
See application file for complete search history.

(56) References Cited

U.S. PATENT DOCUMENTS 7,305,677 B2 * 12/2007 Marcey ................. G06F 9/5044
715/769
8,713,098 B1 * 4/2014 Adya ................. H04L 63/0807
707/610

(Continued)

FOREIGN PATENT DOCUMENTS

CN 1858755 A 11/2006
CN 101609321 A 12/2009

(Continued)

OTHER PUBLICATIONS

Xue et al.A secure cross-platform mobile IM system for enterprise applications. 2011 International Conference on Uncertainty Reasoning and Knowledge Engineering, 2011 pp. 158-161. Retrieved on [Jan. 6, 2017] Retrieved from the Internet:URL<http://ieeexplore.ieee.org/stamp/stamp.jsp?tp=&arnumber=6007933>.*

(Continued)

*Primary Examiner* — Thuy Dao
*Assistant Examiner* — Cheneca Smith
(74) *Attorney, Agent, or Firm* — Anova Law Group, PLLC

(57) ABSTRACT

Methods, apparatus, and communication systems for implementing an internet application are disclosed. A number N of code files of a processing logic used for implementing a first internet application can be loaded in a memory and can be compiled into a runtime library. The runtime library can be registered to the first internet application. A message data package can be received from an internet application client and parsed to obtain an internet application identification. When the internet application identification indicates that the message data package corresponds to the first internet application, a corresponding function in the runtime library of the first internet application can be called to process the (Continued)

message data package, according to a message identification contained in the message data package.

20 Claims, 7 Drawing Sheets

(56) References Cited

U.S. PATENT DOCUMENTS

| | | | | |
|---|---|---|---|---|
| 2001/0034782 | A1* | 10/2001 | Kinkade | H04L 29/06 709/219 |
| 2004/0194111 | A1* | 9/2004 | Marcey | G06F 9/5044 719/310 |
| 2006/0167981 | A1* | 7/2006 | Bansod | G06F 9/547 709/203 |
| 2007/0025342 | A1* | 2/2007 | Obata | H04L 45/34 370/352 |
| 2007/0256055 | A1* | 11/2007 | Herscu | G06F 8/51 717/115 |
| 2009/0150873 | A1* | 6/2009 | Taneda | G06F 9/45508 7/148 |

FOREIGN PATENT DOCUMENTS

| | | |
|---|---|---|
| CN | 101626380 A | 1/2010 |
| CN | 101799768 A | 8/2010 |
| CN | 101877031 A | 11/2010 |
| CN | 102497453 A | 6/2012 |

OTHER PUBLICATIONS

Amalfitano et al. "Rich internet application testing using execution trace data." Software Testing, Verification, and Validation Workshops (ICSTW), 2010 Third International Conference on. IEEE, 2010.Retrieved on [Jan. 6, 2017] Retrieved from the Internet:URL<http://ieeexplore.ieee.org/stamp/stamp.jsp?arnumber=5463657>.*
The World Intellectual Property Organization (WIPO) International Search Report for PCT/CN2013/087225 Feb. 20, 2014.
The State Intellectual Property Office of the People's Republic of China (SIPO) Office Action 1 for 201310027463.2 Dec. 9, 2014.
The State Intellectual Property Office of the People's Republic of China (SIPO) Office Action 2 for 201310027463.2 Mar. 13, 2015.

* cited by examiner

METHOD, APPARATUS, AND COMMUNICATION SYSTEM FOR IMPLEMENTING INTERNET APPLICATION

CROSS-REFERENCES TO RELATED APPLICATIONS

This application is a continuation application of PCT Patent Application No. PCT/CN2013/087225, filed on Nov. 15, 2013, which claims priority to Chinese Patent Application No. CN2013100274632, filed on Jan. 24, 2013, the entire contents of all of which are incorporated herein by reference.

FIELD OF THE DISCLOSURE

The disclosure relates to the field of Internet technology and, more particularly, relates to methods, apparatus, and communication systems for implementing internet applications.

BACKGROUND

With development of the Internet technology, client-based on-line games emerge into website-based on-line games. As the market rapidly changes, there are rising demands on development cycle, development efficiency, and version iteration speed for on-line game developers.

When developing an internet application (e.g., an on-line game), in addition to designing the internet application on a client side (e.g., a game client), programming is needed on a server side for the developers to deploy the server to support operation logic including on-line interaction, data storing, etc. for a large number of players. Typically, each internet application needs to develop its own server, and to use C, C++, Java, and other programming languages to develop the server code. Most of current technologies deploy all or part of processing logic of the internet application on the server side.

That most of current technologies deploy all or part of processing logic of the internet applications (e.g., an on-line game) on the server side requires the developer to have high level on technology, because of complexity of the programming languages and requirements for programming on the server side. Therefore, different development teams are required for specialized programming on each of the client side and the server side. This provides the production of an internet application with a long cycle and low efficiency. Meanwhile, because the backstage server of the internet application is exclusive to support a specific internet application, operation and maintenance cost is undesirably increased.

BRIEF SUMMARY OF THE DISCLOSURE

One aspect of the present disclosure includes a method for implementing an internet application. A number N of code files of a processing logic used for implementing a first internet application can be loaded in a memory. The N code files loaded in the memory can be compiled into a runtime library. The runtime library can be registered to the first internet application. A message data package can be received from an internet application client and can be parsed to obtain an internet application identification. According to a message identification contained in the message data package, a corresponding function in the runtime library of the first internet application can be called to process the message data package, when the internet application identification indicates that the message data package corresponds to the first internet application.

Another aspect of the present disclosure includes an apparatus for implementing an internet application. The apparatus can include a runtime library implementing unit, a receiving unit, a parsing unit, and/or a calling unit. The runtime library implementing unit can be configured to load N code files of a processing logic used for implementing a first internet application in a memory, wherein N is a number, to compile the N code files loaded in the memory into a runtime library of the first internet application, to register the runtime library of the first internet application. The receiving unit can be configured to receive a message data package from an internet application client. The parsing unit can be configured to parse the message data package to obtain an internet application identification contained in the message data package. The calling unit can be configure to call a corresponding function in the runtime library of the first internet application to process the message data package, according to a message identification contained in the message data package, when the internet application identification indicates that the message data package corresponds to the first internet application.

Another aspect of the present disclosure includes a communication system. The communication system can include an access server and an internet application server. The access server and the internet application server can communicate with each other. The access server is configured to receive a message data package from an internet application client and to forward the message data package to the internet application server. The internet application server is configured to load N code files of a processing logic used for implementing a first internet application in a memory, wherein N is a number; to compile the N code files loaded in the memory into a runtime library of the first internet application; to register the runtime library of the first internet application; to receive a message data package from an internet application client; to parse the message data package to obtain an internet application identification contained in the message data package; and to call a corresponding function in the runtime library of the first internet application to process the message data package, according to a message identification contained in the message data package, when the internet application identification indicates that the message data package corresponds to the first internet application.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

FIGS. 1-8 depict exemplary methods, network architectures, apparatus (e.g., servers), and communication systems for implementing an internet application in accordance with various disclosed embodiments. The exemplary methods, network architectures, apparatus, and communication systems can be implemented in an exemplary environment 900 as shown in FIG. 9.

Figure 9:
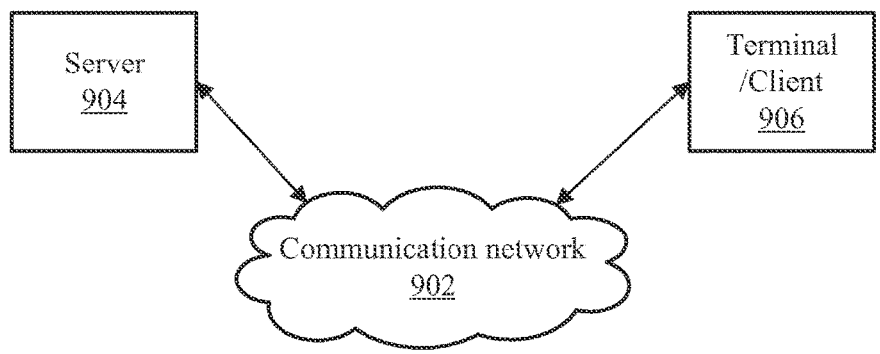
FIG. 9 depicts an exemplary environment incorporating certain disclosed embodiments.

In FIG. 9, the environment 900 can include a server 904, a terminal 906, and a communication network 902. The server 904 and the terminal 906 may be coupled through the communication network 902 for information exchange, for example, Internet searching, webpage browsing, etc. Although only one terminal 906 and one server 904 are shown in the environment 900, any number of terminals 906 or servers 904 may be included, and other devices may also be included.

The communication network 902 may include any appropriate type of communication network for providing network connections to the server 904 and terminal 906 or among multiple servers 904 or terminals 906. For example, the communication network 902 may include the Internet or other types of computer networks or telecommunication networks, either wired or wireless.

A terminal, as used herein, may refer to any appropriate user terminal device with certain computing capabilities, for example, a personal computer (PC), a work station computer, a notebook computer, a car computer (e.g., carrying in a car or other vehicles), a server computer, a hand-held computing device (e.g., a tablet computer), a mobile terminal (e.g., a mobile phone, a smart phone, an iPad, and/or an aPad), a POS (i.e., point of sale) device, or any other user-side computing device. In various embodiments, the terminal 906 can include, e.g., one or more clients such as an internet application client. In some cases, the internet application client can be hardware and/or software installed in a hardware.

A server, as used herein, may refer one or more server computers configured to provide certain server functionalities, for example, search engines and database management. A server may also include one or more processors to execute computer programs in parallel. Exemplary server can include an access server, an internet application server, etc.

Figure 10:
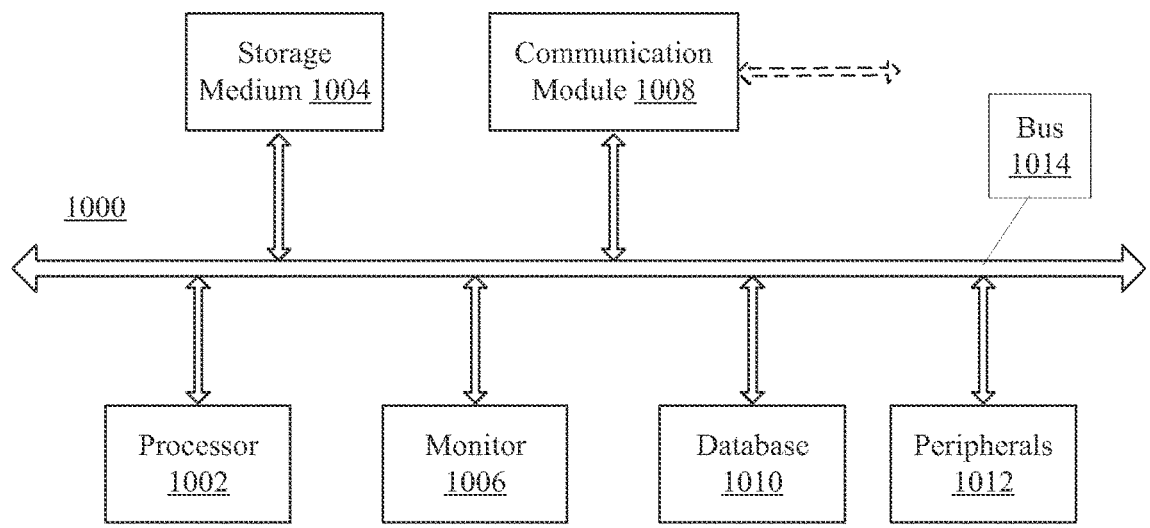
FIG. 10 depicts an exemplary server consistent with the disclosed embodiments.

The server 904 and the terminal 906 may be implemented on any appropriate computing platform. FIG. 10 shows a block diagram of an exemplary computing system 1000 capable of implementing the server 904 and/or the terminal 906. As shown in FIG. 10, the exemplary computer system 1000 may include a processor 1002, storage medium 1004, a monitor 1006, a communication module 1008, a database 1010, peripherals 1012, and one or more bus 1014 to couple the devices together. Certain devices may be omitted and other devices may be included.

The processor 1002 can include any appropriate processor or processors. Further, the processor 1002 can include multiple cores for multi-thread or parallel processing. The storage medium 1004 may include memory modules, for example, ROM, RAM, and flash memory modules, and mass storages, for example, CD-ROM, U-disk, removable hard disk, etc. The storage medium 1004 may store computer programs for implementing various processes, when executed by the processor 1002.

Further, the peripherals 1012 may include I/O devices, for example, keyboard and mouse, and the communication module 1008 may include network devices for establishing connections through the communication network 902. The database 1010 may include one or more databases for storing certain data and for performing certain operations on the stored data, for example, webpage browsing, database searching, etc.

In operation, the terminal 906 may cause the server 904 to perform certain actions, for example, an Internet search or other database operations. The server 904 may be configured to provide structures and functions for such actions and operations. More particularly, the server 904 may include a data searching system for real-time database searching. In various embodiments, a terminal, for example, a mobile terminal involved in the disclosed methods and systems can include the terminal 906.

As discussed above, exemplary terminal may include, for example, PCs (i.e., personal computer), tablet PCs, mobile phones, PDAs (i.e., personal digital assistant), e-readers, laptops, automotive terminals (e.g., terminals carried by motor vehicles) and/or other devices. In an exemplary embodiment, the browser can be a browser based on a webkit kernel, and the browser engine can be a JS (Java Script) engine. Exemplary JS browser engine can be a JSC (i.e., java script core, a kind of JavaScript engine) engine. The JSC engine can be contained in the webkit kernel of the browser. The browser can be installed on a terminal. As used herein, unless otherwise specified, a terminal can be referred to as a terminal installed with one or more browsers, a terminal containing installed browser(s), or a browser-installed-terminal.

As used herein, an operating environment of a browser refers to a system environment of a browser-installed-terminal. The system environment can include, e.g., a CPU environment of the terminal. The CPU environment of a terminal (or terminal CPU environment) can include, e.g., types of instruction sets supported by the CPU in the terminal. The types of the instruction sets can include, e.g., a vfp (i.e., vector flooting-point coprocessor for ARM) instruction set, a neon (i.e., an extended structure suitable for ARM processors) instruction set, a vfpv3 instruction set, a vfpv2 instruction set, a vfpv1 instruction set, a SSE (i.e., streaming SIMD extensions) instruction set, etc. The terminal CPU environment can also include, for example, types, quantities, frequencies, and other suitable parameters of a CPU that is used in the terminal.

In various embodiments, the operation mode of the browser engine can include, for example, a JIT (i.e., just-in-time) operation mode or an interpreter operation mode. The JIT operation mode includes, e.g., before executing the program code, translating the byte code to native machine code and operating the translated native machine code on the CPU. The interpreter operation mode includes, e.g., executing the program code in a manner to execute a line right after interpreting the line.

Methods, network architectures, apparatus, and communication systems for implementing internet applications are provided to simplify maintenance complexity, decrease operation and maintenance cost, and increase production efficiency of the internet applications.

For example, a number N of code files of a processing logic used for implementing a first internet application can be loaded in a memory. The N code files loaded in the memory can be compiled into a runtime library. The runtime library can be registered to the first internet application. A message data package can be received from an internet application client and parsed to obtain an internet application identification. A corresponding function in the runtime library of the first internet application can be called to process the message data package, according to a message identification contained in the message data package, when the internet application identification indicates that the message data package corresponds to the first internet application.

Figure 1:
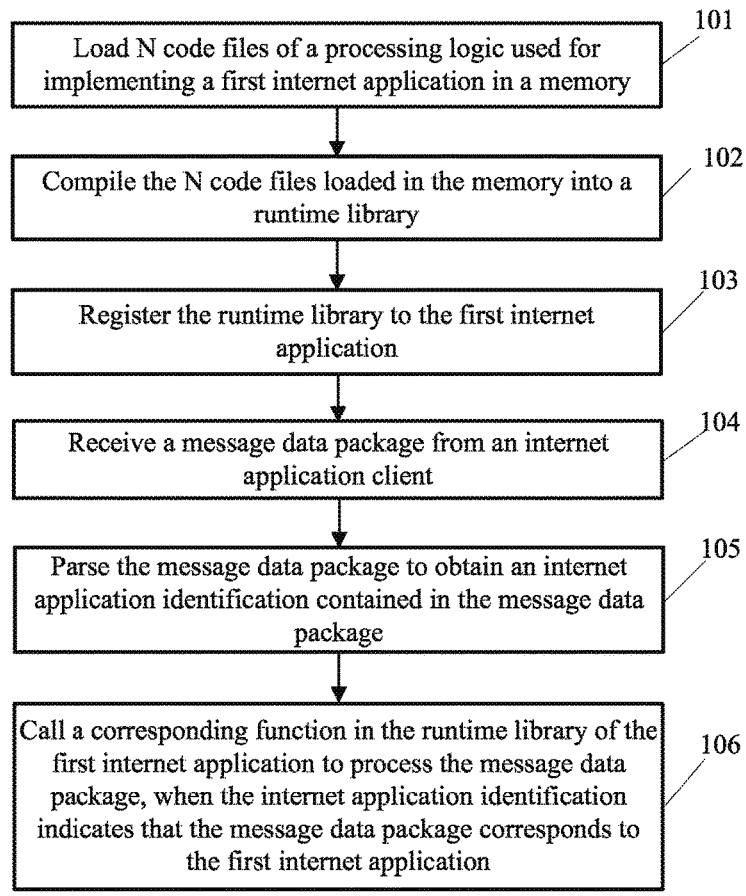
FIG. 1 depicts an exemplary method for implementing an internet application in accordance with various disclosed embodiments.

FIG. 1 depicts an exemplary method for implementing an internet application in accordance with various disclosed embodiments.

In Step 101, a number N of code files of a processing logic used for implementing a first internet application is loaded in a memory.

In some embodiments, the N code files can include JS (JavaScript) files or other suitable types of code files. In some embodiments, information including, e.g., a path for the N code files of the processing logic used for implementing the first internet application can be written into a configuration file. When initializing the system, according to the path information recorded in the configure file, the N code files of the processing logic used for implementing the first internet application can be loaded in the memory.

In Step 102, the N code files loaded in the memory is compiled into a runtime library.

In Step 103, the runtime library is registered to the first internet application.

In some embodiments, a compiler can be used to compile the N code files loaded in the memory into the runtime library of the first internet application, and to execute the registration of the runtime library to the first internet application. After the registration of the runtime library, each function in the runtime library can be recognized and called by the system.

In Step 104, a message data package is received from an internet application client. The received message data package can include message data packages from various internet application clients. Depending on the types of the message data packages, different types of the message data packages can be executed in a different manner.

In Step 105, the message data package is parsed to obtain an identification of the internet application (i.e., internet application identification) contained in the message data package.

In Step 106, a corresponding function in the runtime library of the first internet application is called to process the message data package, according to a message identification contained in the message data package, when the internet application identification indicates that the message data package corresponds to the first internet application.

In some embodiments, the disclosed method can further include: obtaining processing results after processing the message data package by the corresponding function in the runtime library of the first internet application; feeding back the processing results to the internet application client, and/or persisting the processing results to a local cache.

In some embodiments, the message data package can further contain user identification (and/or login identification to login the internet application). Before calling the corresponding function in the runtime library to process the message data package, the method can further include: for example, according to the user identification, searching in the local cache whether there are user data corresponding to the user identification; and reading the user data corresponding to the user identification from a backstage database to the local cache when the user data corresponding to the user identification are not found in the local cache.

In some embodiments, when the message identification contained in the message data package is a logout identification of the internet application, the step of "according to the message identification contained in the message data package, calling the corresponding function in the runtime library of the first internet application to process the message data package" can further include: according to the internet application logout identification contained in the message data package, calling the corresponding function in the runtime library to persist the user data corresponding to the user identification recorded in the local cache to the backstage database. After persisting the user data to the backstage database, the user can logout the first internet application.

The processing logic of the first internet application can therefore be implemented based on the above description, and the processing logic of different internet applications can be implemented in a similar manner.

The exemplary method as disclosed in FIG. 1 can be implemented on an internet application server. The internet application server can support at least one internet application including the first the internet application.

As disclosed, the N code files of the processing logic used for implementing the first internet application can be loaded in a memory. The N code files loaded in the memory can be compiled to the runtime library of the first internet application. After receiving the message data package from the internet application client, the message data package can be parsed to obtain the internet application identification contained in the message data package. When the internet application identification indicates that the message data package corresponds to the first internet application, according to the message identification contained in the message data package, a corresponding function in the runtime library of the first internet application can be called to process the message data package.

Because the code of the processing logic for implementing the first internet application is encapsulated into N code files, the code files of the same processing logic can be repeatedly used for implementing different internet applications. In addition, the code framework of the internet applications can be simplified, which can further facilitate to simplify the maintenance complexity of the internet applications. The code of complicated processing logic for implementing the internet applications can be encapsulated into code files. The backstage server can directly use these code files for implementing the complicated processing logic by loading a calling-mode. This decreases development threshold of the backstage server of the internet application; improves development efficiency; decreases operation and maintenance cost; increases production efficiency of the internet application, and performs version iteration according to a rapid response of the market.

Figure 2A:
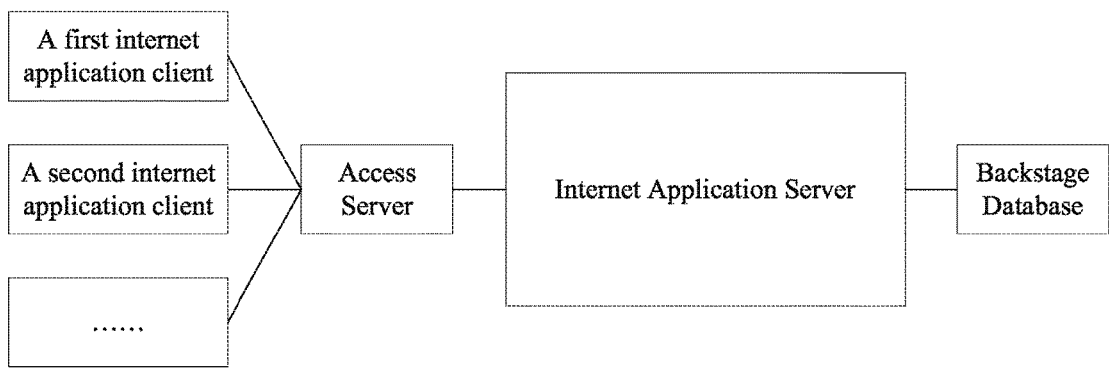
FIG. 2A depicts an exemplary network architecture in accordance with various disclosed embodiments.

For illustration purposes, exemplary application scenarios can be provided herein as follows. For example, FIG. 2A depicts an exemplary network architecture in accordance with various disclosed embodiments. Based on the exemplary network architecture in FIG. 2A, FIG. 2B depicts an exemplary method for implementing an internet application in accordance with various disclosed embodiments.

Figure 2B:
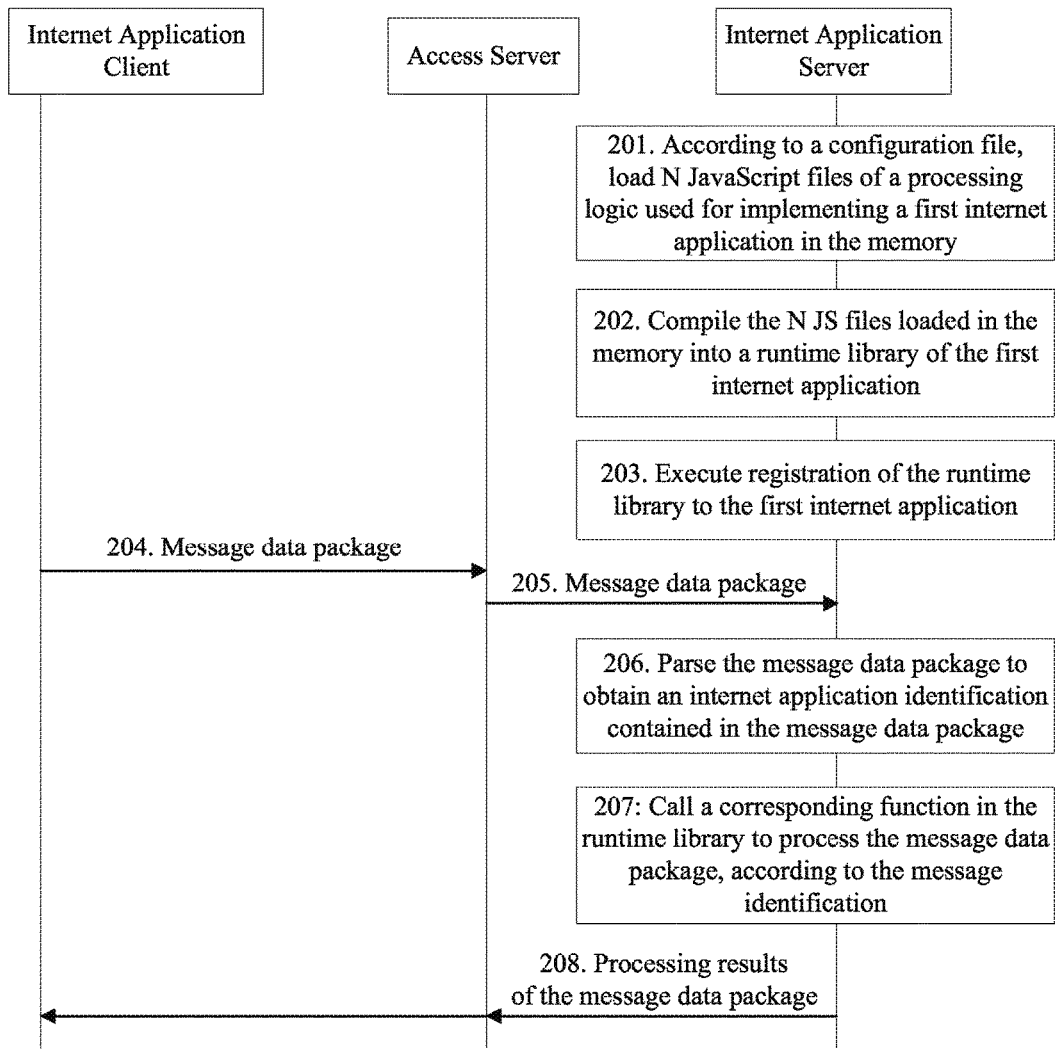
FIG. 2B depicts another exemplary method for implementing an internet application in accordance with various disclosed embodiments.

Referring to FIG. 2B, in Step 201, according to a configuration file, an internet application server loads N JavaScript files of a processing logic used for implementing a first internet application in the memory.

In some embodiments, information including, e.g., a path for a number (N) of JS files of the processing logic used for implementing the first internet application can be written into the configuration file. When initializing the system, according to the path information recorded in the configure file, the N JS files of the processing logic used for implementing the first internet application can be loaded in the memory.

In Step 202, the internet application server compiles the N JS files loaded in the memory into a runtime library of the first internet application;

In Step 203, the internet application server executes registration of the runtime library to the first internet application.

In some embodiments, a compiler can be used to compile the N JS files loaded in the memory into the runtime library of the first internet application, and to execute the registration of the runtime library of the first internet application. After the registration of the runtime library, each function in the runtime library can be recognized and called by the internet application server.

In Step 204, an access server receives a message data package from an internet application client. The received message data package can include message data packages from various internet application clients. Depending on the types of the message data packages, different types of the message data packages can be executed in a different manner.

In Step 205, the access server forwards the message data package received from the internet application client to the internet application server.

In Step 206, the internet application server receives the message data package from the internet application client and parses the message data package to obtain an internet application identification contained in the message data package.

In Step 207, when the internet application server finds out that the internet application identification contained in the message data package indicates that the message data package corresponds to the first internet application, the internet application server can call a corresponding function in the runtime library of the first internet application to process the message data package, according to the message identification contained in the message data package.

In Step 208, the internet application server obtains processing results after processing the message data package by the corresponding function in the runtime library of the first internet application; and persists the processing results to a local cache and forwards the processing results to the internet application client via the access server.

In some embodiments, the message data package can further contain user identification (and/or login identification to login the internet application). Before calling the corresponding function in the runtime library to process the message data package, for example, the internet application server, according to the user identification, can search in the local cache whether there are user data corresponding to the user identification. When the user data corresponding to the user identification are not found in the local cache, the internet application server can read the user data corresponding to the user identification from the backstage database to the local cache.

In some embodiments, when the message identification contained in the message data package is a logout identification of the internet application, that the internet application server calls the corresponding function in the runtime library of the first internet application to process the message data package according to the message identification contained in the message data package can further include: according to logout identification of the internet application contained in the message data package, the internet application server can call the corresponding function in the runtime library to persist the user data corresponding to the user identification recorded in the local cache to the backstage database. After persisting the user data to the backstage database, the user can logout the first internet application.

The processing logic of the first internet application can therefore be implemented based on the above description, and the processing logic of different internet applications can be implemented in a similar manner.

FIG. 2A depicts an exemplary network architecture for implementing an internet application, although, in practical application, other network architectures can be used for implementing internet applications without limitation.

As disclosed, the internet application server can load the N JS files of the processing logic used for implementing the first internet application in a memory. The internet application server can compile the N JS files loaded in the memory to the runtime library of the first internet application. After receiving the message data package from the internet application client, the internet application server can parse the message data package to obtain the internet application identification contained in the message data package. When the internet application identification indicates that the message data package corresponds to the first internet application, according to the message identification contained in the message data package, the internet application server can call a corresponding function in the runtime library of the first internet application to process the message data package.

Because the code of the processing logic for implementing the first internet application is encapsulated into N JS files, the JS files of the same processing logic can be repeatedly used for implementing different internet applications. In addition, the code framework of the internet applications can be simplified, which can further facilitate to simplify the maintenance complexity of the internet applications. The code of complicated processing logic for implementing the internet applications can be encapsulated into JS files. The backstage server can directly use these JS files for implementing the complicated processing logic by loading a calling-mode. This decreases development threshold of the backstage server of the internet application; improves development efficiency; decreases operation and maintenance cost; increases production efficiency of the internet application, and performs version iteration according to a rapid response of the market.

Figure 3A:
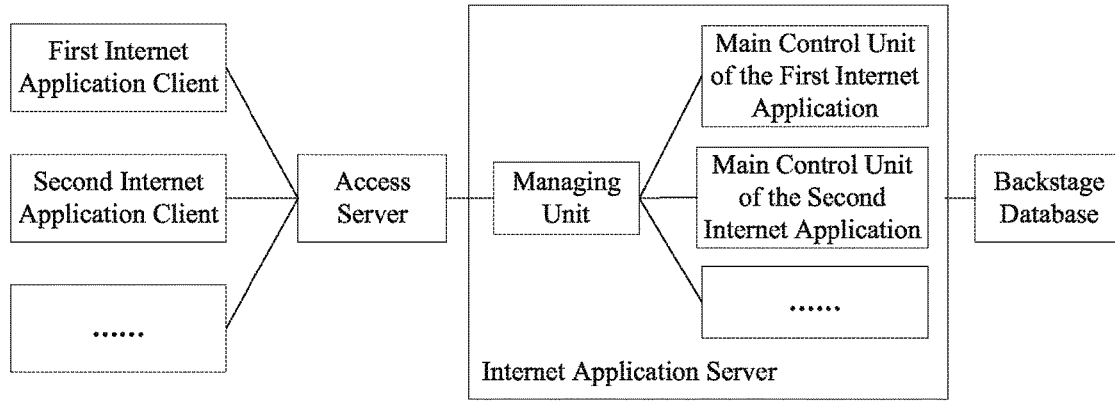
FIG. 3A depicts another exemplary network architecture in accordance with various disclosed embodiments.

FIG. 3A depicts an exemplary network architecture in accordance with various disclosed embodiments. Based on the exemplary network architecture in FIG. 3A, FIG. 3B depicts an exemplary method for implementing an internet application in accordance with various disclosed embodiments.

Figure 3B:
FIG. 3B depicts another exemplary method for implementing an internet application in accordance with various disclosed embodiments.

Referring to FIG. 3B, in Step 301, according to a configuration file, a managing unit on an internet application server starts a main control unit of the first internet application. The main control unit of the first internet application is configured to load N JavaScript files of a processing logic used for implementing a first internet application in the memory.

In some embodiments, information including, e.g., a path for a number (N) of JS files of the processing logic used for implementing the first internet application can be written into the configuration file. When in system initializing, according to the path information recorded in the configure file, the N JS files of the processing logic used for implementing the first internet application can be loaded in the memory.

The started main control unit of the first internet application can be executed in a processor, which can be regarded as having started a main control process of the first internet application.

In Step 302, the managing unit compiles the N JS files loaded in the memory into a runtime library of the first internet application.

In Step 303, the managing unit executes registration of the runtime library of the first internet application to register the runtime library of the first internet application to the main control unit of the first internet application.

In some embodiments, a compiler can be used to compile the N JS files loaded in the memory into the runtime library of the first internet application, and to execute the registration of the runtime library of the first internet application. After the registration of the runtime library, each function in the runtime library can be recognized and called by the main control unit of the internet application server.

In Step 304, an access server receives a message data package from an internet application client.

The received message data package can include message data packages from various internet application clients. Depending on the types of the message data packages, different types of the message data packages can be executed in a different manner.

In Step 305, the access server forwards the message data package received from the internet application client to the internet application server.

In Step 306, the managing unit of the internet application server receives the message data package from the internet application client and parses the message data package to obtain an internet application identification contained in the message data package.

In Step 307, when the managing unit of the internet application server finds out that the internet application identification contained in the message data package indicates that the message data package corresponds to the first internet application, the managing unit of the internet application server can forward the message data package to the main control unit of the first internet application.

In Step 308, according to the message identification contained in the message data package, the main control unit of the first internet application calls a corresponding function in the runtime library of the first internet application to process the message data package.

In Step 309, the main control unit of the first internet application obtains processing results after processing the message data package by the corresponding function in the runtime library of the first internet application; and feeds back the processing results to the managing unit of the internet application client, and/or persists the processing results to a local cache.

In Step 310, the managing unit forwards the processing results to the internet application client via the access server.

In some embodiments, the message data package can further contain user identification (and/or login identification to login the internet application). Before calling the corresponding function in the runtime library to process the message data package and according to the user identification, the managing unit or the main control unit of the first internet application can search in the local cache whether there are user data corresponding to the user identification. When the user data corresponding to the user identification are not found in the local cache, the managing unit or the main control unit of the first internet application can read the user data corresponding to the user identification from the backstage database to the local cache.

In some embodiments, when the message identification contained in the message data package is a logout identification of the internet application, that the main control unit of the first internet application calls the corresponding function in the runtime library of the first internet application to process the message data package according to the message identification contained in the message data package can further include: according to logout identification of the internet application contained in the message data package, the main control unit of the first internet application can call the corresponding function in the runtime library to persist the user data corresponding to the user identification recorded in the local cache to the backstage database. After persisting the user data to the backstage database, the user can logout the first internet application.

The processing logic of the first internet application can therefore be implemented based on the above description, and the processing logic of different internet applications can be implemented in a similar manner.

FIG. 3A depicts an exemplary network architecture for implementing an internet application, although, in practical application, other network architectures can be used for implementing internet applications without limitation.

As disclosed, the managing unit deployed on the internet application server and the main control unit of one or more internet application are provided. The managing unit can be configured to load the N JS files of the processing logic used for implementing the first internet application in a memory. The managing unit can compile the N JS files loaded in the memory to the runtime library of the first internet application. After receiving the message data package from the internet application client, the managing unit can parse the message data package to obtain the internet application identification contained in the message data package. When the internet application identification indicates that the message data package corresponds to the first internet application, according to the message identification contained in the message data package, the managing unit can call a corresponding function in the runtime library of the first internet application to process the message data package.

Because the code of the processing logic for implementing the first internet application is encapsulated into N JS files, the JS files of the same processing logic can be repeatedly used for implementing different internet applications. In addition, the code framework of the internet applications can be simplified, which can further facilitate to simplify the maintenance complexity of the internet applications. The code of complicated processing logic for implementing the internet applications can be encapsulated into JS files. The backstage server can directly use these JS files for implementing the complicated processing logic by loading a calling-mode. This decreases development threshold of the backstage server of the internet application; improves development efficiency; decreases operation and maintenance cost; increases production efficiency of the internet application, and performs version iteration according to a rapid response of the market.

Various embodiments also provide apparatus for implementing internet applications.

Figure 4A:
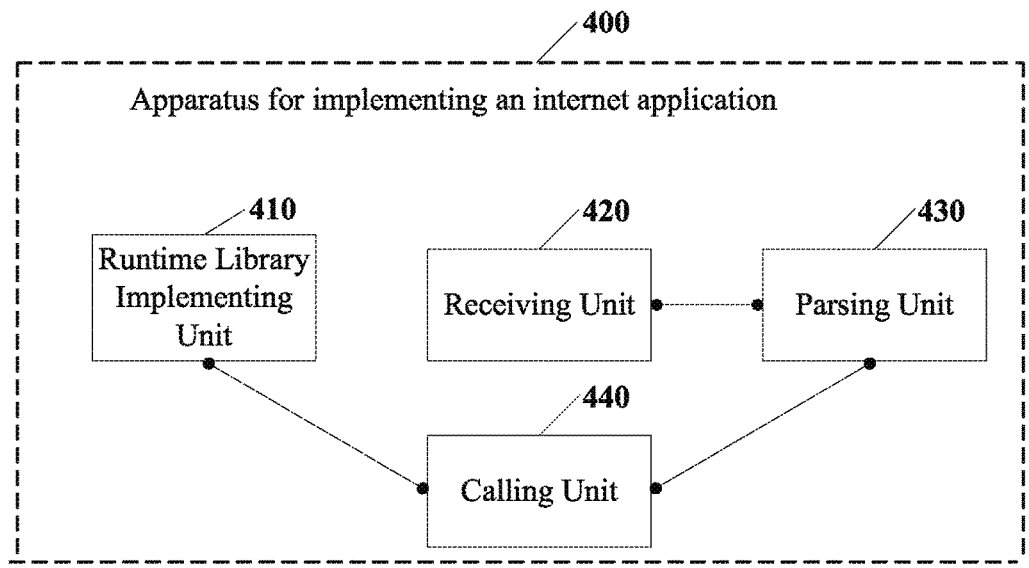
FIG. 4A depicts an exemplary apparatus for implementing an internet application in accordance with various disclosed embodiments.

FIG. 4A depicts an exemplary apparatus 400 for implementing an internet application in accordance with various disclosed embodiments. The exemplary apparatus 400 can include a runtime library implementing unit 410, a receiving unit 420, a parsing unit 430 and/or a calling unit 440.

The runtime library implementing unit 410 is configured to load N code files of a processing logic used for implementing a first internet application in a memory; compile the N code files loaded in the memory into a runtime library of the first internet application; and execute registration of the runtime library of the first internet application.

In some embodiments, the runtime library implementing unit 410 is configured to write information including, e.g., a path for the N code files of the processing logic used for implementing the first internet application into a configuration file. When in system initializing, according to the path information recorded in the configure file, the runtime library implementing unit 410 can load the N code files of the processing logic used for implementing the first internet application in the memory.

The receiving unit 420 is configured to receive a message data package from an internet application client.

The parsing unit 430 is configured to parse the message data package to obtain an internet application identification contained in the message data package.

The calling unit 440 is configured to call a corresponding function in the runtime library of the first internet application to process the message data package, according to the message identification contained in the message data package, when the internet application identification indicates that the message data package corresponds to the first internet application.

Figure 4B:
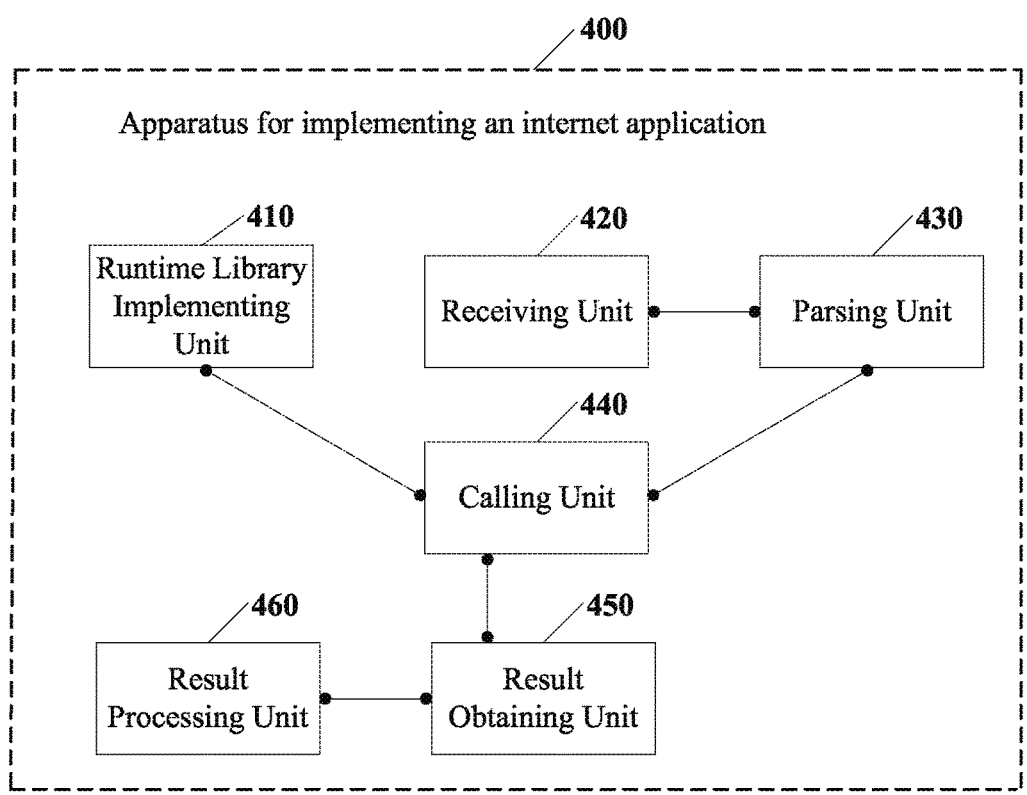
FIG. 4B depicts another exemplary apparatus for implementing an internet application in accordance with various disclosed embodiments.

Referring to FIG. 4B, in some embodiments, the exemplary apparatus 400 further includes: a result obtaining unit 450 and a result processing unit 460.

The result obtaining unit 450 is configured to obtain processing results after processing the message data package by the corresponding function in the runtime library of the first internet application.

The result processing unit 460 is configured to feedback the processing results to the internet application client, and/or to persist the processing results to a local cache.

Figure 4C:
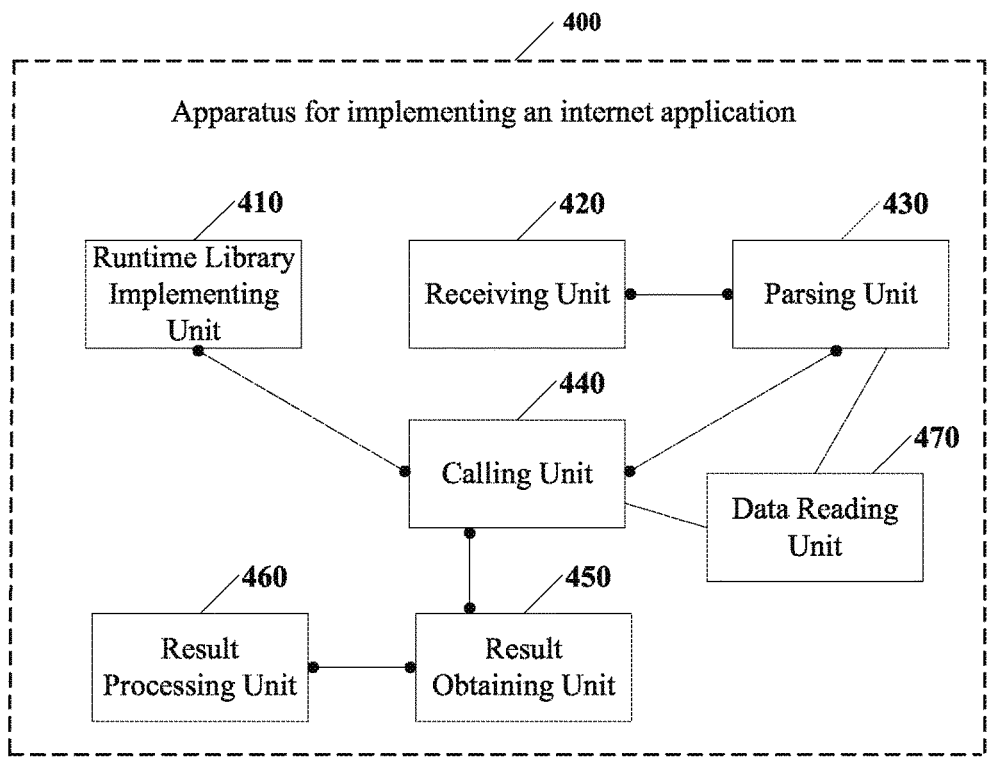
FIG. 4C depicts another exemplary apparatus for implementing an internet application in accordance with various disclosed embodiments.

Referring to FIG. 4C, in some embodiments, the message data package can further contain user identification and the exemplary apparatus further includes a data reading unit 470 configured: before calling the corresponding function in the runtime library to process the message data package, according to the user identification, to search in the local cache whether there are user data corresponding to the user identification. When the user data corresponding to the user identification are not found in the local cache, the data reading unit 470 is configured to read the user data corresponding to the user identification from the backstage database to the local cache.

In various embodiments, the N code files include the JavaScript files.

Note that each module in the exemplary apparatus 400 for implementing the internet application can provide functions according to the methods for implementing the internet application as disclosed herein. The processing method of each module is therefore not repeated.

As disclosed, the exemplary apparatus 400 for implementing the internet application can load the N code files of the processing logic used for implementing the first internet application in a memory. The N code files loaded in the memory can be compiled to the runtime library of the first internet application. After receiving the message data package from the internet application client, the message data package can be parsed to obtain the internet application identification contained in the message data package. When the internet application identification indicates that the message data package corresponds to the first internet application, according to the message identification contained in the message data package, a corresponding function in the runtime library of the first internet application can be called to process the message data package.

Because the code of the processing logic for implementing the first internet application is encapsulated into N code files, the code files of the same processing logic can be repeatedly used for implementing different internet applications. In addition, the code framework of the internet applications can be simplified, which can further facilitate to simplify the maintenance complexity of the internet applications. The code of complicated processing logic for implementing the internet applications can be encapsulated into code files. The backstage server can directly use these code files for implementing the complicated processing logic by loading a calling-mode. This decreases development threshold of the backstage server of the internet application; improves development efficiency; decreases operation and maintenance cost; increases production efficiency of the internet application, and performs version iteration according to a rapid response of the market.

Figure 5:
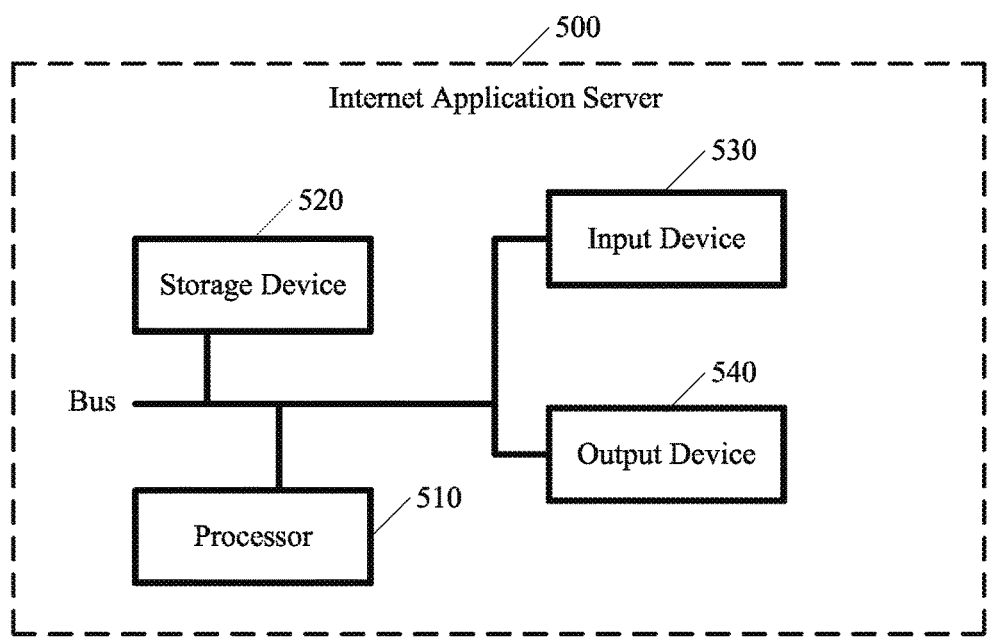
FIG. 5 depicts an exemplary internet application server in accordance with various disclosed embodiments.

Referring to FIG. 5, an internet application server 500 is provided including a processor 510, a storage device 520, an input device 530, and/or an output device 540. One or more processors 510 can be included in the internet application server 500, although FIG. 5 shows one-processor as an example for illustration purposes. In an exemplary embodiment, the processor 510, the storage device 520, the input device 530, and/or the output device 540 can be connected via a bus as shown although other means can be used for such connection without limitation.

The processor 510 can be configured to: load N code files of a processing logic used for implementing a first internet application in a memory; compile the N code files loaded in the memory into a runtime library of the first internet application; execute registration of the runtime library of the first internet application; receive a message data package from an internet application client; parse the message data package to obtain an internet application identification contained in the message data package; and call a corresponding function in the runtime library of the first internet application to process the message data package, according to the message identification contained in the message data package, when the internet application identification indicates that the message data package corresponds to the first internet application.

In various embodiments, the N code files include the JavaScript files or other suitable types of code files.

In some embodiments, information including, e.g., a path for the N code files of the processing logic used for implementing the first internet application can be written into a configuration file. When in system initializing, according to the path information recorded in the configure file, the processor 510 can load the N code files of the processing logic used for implementing the first internet application in the memory.

In some embodiments, the processor 510 can use a compiler to compile the N code files loaded in the memory into the runtime library of the first internet application, and to execute the registration of the runtime library of the first internet application. After the registration of the runtime library, each function in the runtime library can be recognized and called by the system.

In some embodiments, the processor 510 can obtain processing results after processing the message data package by the corresponding function in the runtime library of the first internet application; feeds back the processing results to the internet application client, and/or persists the processing results to a local cache.

In some embodiments, the message data package can further contain user identification (and/or login identification to login the internet application). Before calling the corresponding function in the runtime library to process the message data package, the method can further include: for example, according to the user identification, searching in the local cache whether there are user data corresponding to the user identification; and when the user data corresponding to the user identification are not found in the local cache, reading the user data corresponding to the user identification from the backstage database to the local cache.

In some embodiments, when the message identification contained in the message data package is a logout identification of the internet application, the step of "according to the message identification contained in the message data package, calling the corresponding function in the runtime library of the first internet application to process the message data package" can further include: according to logout identification of the internet application contained in the message data package, calling (e.g., by a calling unit) the corresponding function in the runtime library to persist the user data corresponding to the user identification recorded in the local cache to the backstage database. After persisting the user data to the backstage database, the user can logout the first internet application.

Note that each device in the exemplary internet application server 500 for implementing the internet application can provide functions according to the methods for implementing the internet application as disclosed herein. The processing method of each module is therefore not repeated herein.

As disclosed, the internet application server 500 can load N code files of the processing logic used for implementing the first internet application in a memory. The N code files loaded in the memory can be compiled to the runtime library of the first internet application by the internet application server 500. After receiving the message data package from the internet application client, the message data package can be parsed to obtain the internet application identification contained in the message data package by the internet application server 500. When the internet application identification indicates that the message data package corresponds to the first internet application, according to the message identification contained in the message data package, a corresponding function in the runtime library of the first internet application can be called to process the message data package by the internet application server 500.

Because the code of the processing logic for implementing the first internet application is encapsulated into N code files, the code files of the same processing logic can be repeatedly used for implementing different internet applications. In addition, the code framework of the internet applications can be simplified, which can further facilitate to simplify the maintenance complexity of the internet applications. The code of complicated processing logic for implementing the internet applications can be encapsulated into code files. The backstage server can directly use these code files for implementing the complicated processing logic by loading a calling-mode. This decreases development threshold of the backstage server of the internet application; improves development efficiency; decreases operation and maintenance cost; increases production efficiency of the internet application, and performs version iteration according to a rapid response of the market.

Figure 6:
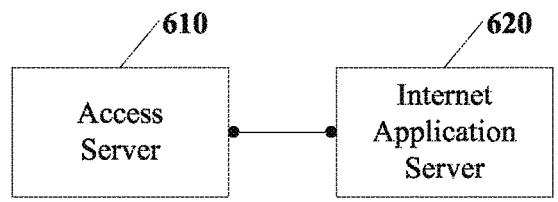
FIG. 6 depicts exemplary communication system in accordance with various disclosed embodiments.

Referring to FIG. 6, an exemplary communication system includes: an access server 610 and/or an internet application server 620.

The access server 610 and the internet application server 620 can communicate with each other, e.g., by the communication network 902 shown in FIG. 9. The access server 610 is configured to receive a message data package from an internet application client and to forward the message data package to the internet application server 620.

The internet application server 620 is configured to load N code files of a processing logic used for implementing a first internet application in a memory; compile the N code files loaded in the memory into a runtime library of the first internet application; execute registration of the runtime library of the first internet application; receive a message data package from an internet application client; parse the message data package to obtain an internet application identification contained in the message data package; and call a corresponding function in the runtime library of the first internet application to process the message data package, according to the message identification contained in the message data package, when the internet application identification indicates that the message data package corresponds to the first internet application.

In various embodiments, the N code files include the JavaScript files or other suitable types of code files.

In some embodiments, information including, e.g., a path for the N code files of the processing logic used for implementing the first internet application can be written into a configuration file. When in system initializing, according to the path information recorded in the configure file, the internet application server 620 can load the N code files of the processing logic used for implementing the first internet application in the memory.

In some embodiments, the internet application server 620 can use a compiler to compile the N code files loaded in the memory into the runtime library of the first internet application, and to execute the registration of the runtime library of the first internet application. After the registration of the runtime library, each function in the runtime library can be recognized and called by the system.

In some embodiments, the internet application server 620 can obtain processing results after processing the message data package by the corresponding function in the runtime library of the first internet application; feeds back the processing results to the internet application client, and/or persists the processing results to a local cache.

In some embodiments, the message data package can further contain user identification (and/or login identification to login the internet application). Before calling the corresponding function in the runtime library to process the message data package, the method can further include: for example, according to the user identification, searching in the local cache whether there are user data corresponding to the user identification; and when the user data corresponding to the user identification are not found in the local cache, reading the user data corresponding to the user identification from the backstage database to the local cache.

In some embodiments, when the message identification contained in the message data package is a logout identification of the internet application, the step of "according to the message identification contained in the message data package, calling the corresponding function in the runtime library of the first internet application to process the message data package" can further include: according to logout identification of the internet application contained in the message data package, calling the corresponding function in the runtime library to persist the user data corresponding to the user identification recorded in the local cache to the backstage database. After persisting the user data to the backstage database, the user can logout the first internet application.

As disclosed, the internet application server 620 can load N code files of the processing logic used for implementing the first internet application in a memory. The N code files loaded in the memory can be compiled to the runtime library of the first internet application by the internet application server 620. After receiving the message data package from the internet application client, the message data package can be parsed to obtain the internet application identification contained in the message data package by the internet application server 620. When the internet application identification indicates that the message data package corresponds to the first internet application, according to the message identification contained in the message data package, a corresponding function in the runtime library of the first internet application can be called to process the message data package by the internet application server 620.

Because the code of the processing logic for implementing the first internet application is encapsulated into N code files, the code files of the same processing logic can be repeatedly used for implementing different internet applications. In addition, the code framework of the internet applications can be simplified, which can further facilitate to simplify the maintenance complexity of the internet applications. The code of complicated processing logic for implementing the internet applications can be encapsulated into code files. The backstage server can directly use these code files for implementing the complicated processing logic by loading a calling-mode. This decreases development threshold of the backstage server of the internet application; improves development efficiency; decreases operation and maintenance cost; increases production efficiency of the internet application, and performs version iteration according to a rapid response of the market.

Figure 7:
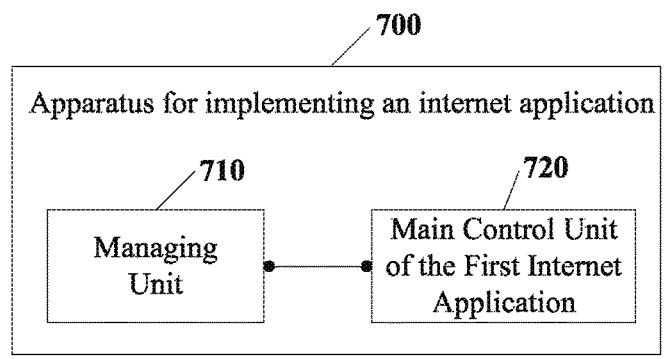
FIG. 7 depicts an exemplary apparatus for implementing an internet application in accordance with various disclosed embodiments.

Referring to FIG. 7, an exemplary apparatus 700 for implementing an internet application includes a managing unit 710 and a main control unit 720 of the first internet application.

The managing unit 710 is configured to start the main control unit 720 of the first internet application. The managing unit 710 is configured to load N code files of a processing logic used for implementing a first internet application in a memory; compile the N code files loaded in the memory into a runtime library of the first internet application; register the runtime library to the main control unit 720 of the first internet application; receive a message data package from an internet application client; parse the message data package to obtain an internet application identification contained in the message data package; and forward the message data package to the main control unit 720 of the first internet application, when the internet application identification indicates that the message data package corresponds to the first internet application.

The main control unit 720 of the first internet application is configured to call a corresponding function in the runtime library of the first internet application to process the message data package, according to the message identification contained in the message data package.

In various embodiments, the N code files include the JavaScript files or other suitable types of code files.

In some embodiments, the managing unit 710 is also configured to receive processing results returned from the main control unit 720 of the first internet application after processing the message data package; feed the processing results back to the internet application client, and/or persist the processing results to a local cache.

In some embodiments, the message data package can further contain user identification (and/or login identification to login the internet application).

The managing unit 710 or the main control unit 720 of the first internet application is also configured, before calling the corresponding function in the runtime library to process the message data package, to search in the local cache whether there are user data corresponding to the user identification according to the user identification. When the user data corresponding to the user identification are not found in the local cache, the managing unit 710 or the main control unit 720 of the first internet application is configured to read the user data corresponding to the user identification from the backstage database to the local cache Note that each module in the exemplary apparatus 700 for implementing the internet application can provide functions according to the methods for implementing the internet application as disclosed herein. The processing method of each module is therefore not repeated.

As disclosed, the exemplary apparatus 700 for implementing the internet application deploy the managing unit 710 and the main control unit 720 of the first internet application. The managing unit 710 is configured to load the N code files of the processing logic used for implementing the first internet application in a memory, and to compile the N code files loaded in the memory to the runtime library of the first internet application. After receiving the message data package from the internet application client, the managing unit 710 is configured to parse the message data package to obtain the internet application identification contained in the message data package. When the internet application identification indicates that the message data package corresponds to the first internet application, the main control unit 720 of the first internet application is configured, according to the message identification contained in the message data package, to call a corresponding function in the runtime library of the first internet application to process the message data package.

Because the code of the processing logic for implementing the first internet application is encapsulated into N code files, the code files of the same processing logic can be repeatedly used for implementing different internet applications. In addition, the code framework of the internet applications can be simplified, which can further facilitate to simplify the maintenance complexity of the internet applications. The code of complicated processing logic for implementing the internet applications can be encapsulated into code files. The backstage server can directly use these code files for implementing the complicated processing logic by loading a calling-mode. This decreases development threshold of the backstage server of the internet application; improves development efficiency; decreases operation and maintenance cost; increases production efficiency of the internet application, and performs version iteration according to a rapid response of the market.

Figure 8:
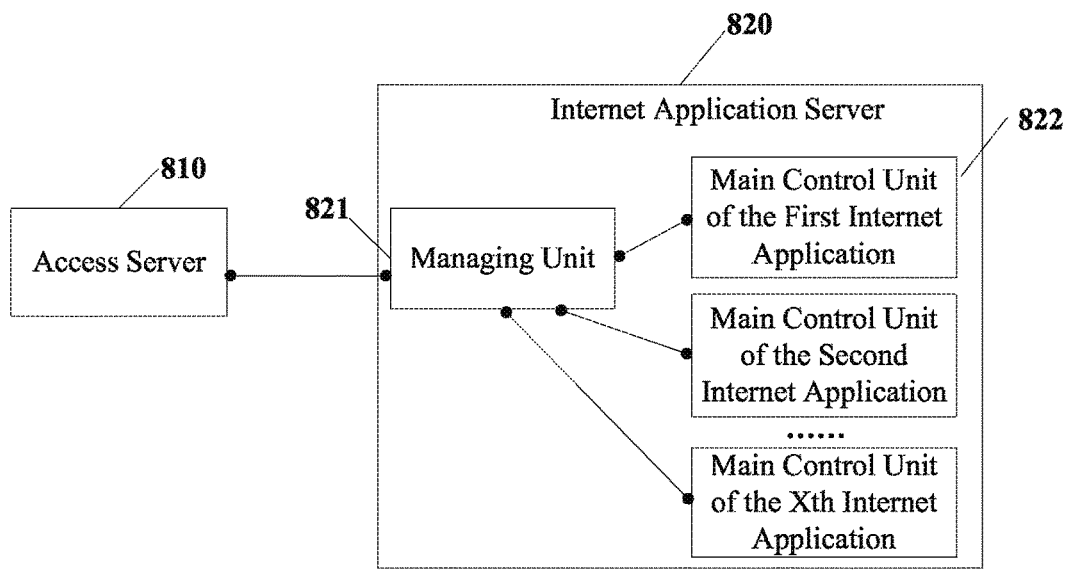
FIG. 8 depicts another exemplary communication system in accordance with various disclosed embodiments.

Referring to FIG. 8, another exemplary communication system includes: an access server 810 and/or an internet application server 820.

The access server 810 and the internet application server 820 can communicate with each other. The internet application server 820 includes a managing unit 821 and control units of a number M of internet applications including a main control unit 822 of the first internet application. In various embodiments, the internet applications or the first internet application include an on-line game.

The access server 810 is configured to receive the message data package from an internet application client, and to forward the message data package to the internet application server 820.

The managing unit 821 of the internet application server 820 is configured to start the main control unit 822 of the first internet application. The managing unit 821 of the internet application server 820 is configured to load N code files of a processing logic used for implementing a first internet application in a memory; compile the N code files loaded in the memory into a runtime library of the first internet application; register the runtime library to the main control unit 822 of the first internet application; receive a message data package from an internet application client; parse the message data package to obtain an internet application identification contained in the message data package; and forward the message data package to the main control unit 822 of the first internet application, when the internet application identification indicates that the message data package corresponds to the first internet application.

The main control unit 822 of the first internet application on the internet application server 820 is configured to call a corresponding function in the runtime library of the first internet application to process the message data package, according to the message identification contained in the message data package.

In some embodiments, information including, e.g., a path for the N code files of the processing logic used for implementing the first internet application can be written into a configuration file. When in system initializing, according to the path information recorded in the configure file, the managing unit 821 is configured to load the N code files of the processing logic used for implementing the first internet application in the memory.

In some embodiments, the managing unit 821 can use a compiler to compile the N code files loaded in the memory into the runtime library of the first internet application, and to execute the registration of the runtime library of the first internet application. After the registration of the runtime library, each function in the runtime library can be recognized and called by the system.

In some embodiments, the managing unit 821 or the main control unit 822 of the first internet application is configured to obtain processing results after processing the message data package by the corresponding function in the runtime library of the first internet application; feeds back the processing results to the internet application client, and/or persists the processing results to a local cache.

In some embodiments, the message data package can further contain user identification (and/or login identification to login the internet application). Before calling the corresponding function in the runtime library to process the message data package, the exemplary system can further include: for example, according to the user identification, searching in the local cache whether there are user data corresponding to the user identification; and when the user data corresponding to the user identification are not found in the local cache, reading the user data corresponding to the user identification from the backstage database to the local cache.

In some embodiments, when the message identification contained in the message data package is a logout identification of the internet application, the step of "according to the message identification contained in the message data package, calling the corresponding function in the runtime library of the first internet application to process the message data package" can further include: according to logout identification of the internet application contained in the message data package, calling the corresponding function in the runtime library to persist the user data corresponding to the user identification recorded in the local cache to the backstage database. After persisting the user data to the backstage database, the user can logout the first internet application.

As disclosed, the internet application server 820 includes the managing unit 821 and control units of a number M of internet applications including the main control unit 822 of the first internet application. The managing unit 821 is configured to load the N code files of the processing logic used for implementing the first internet application in a memory, and to compile the N code files loaded in the memory to the runtime library of the first internet application. After receiving the message data package from the internet application client, the managing unit 821 is configured to parse the message data package to obtain the internet application identification contained in the message data package. When the internet application identification indicates that the message data package corresponds to the first internet application, the main control unit 822 of the first internet application is configured, according to the message identification contained in the message data package, to call a corresponding function in the runtime library of the first internet application to process the message data package.

Because the code of the processing logic for implementing the first internet application is encapsulated into N code files, the code files of the same processing logic can be repeatedly used for implementing different internet applications. In addition, the code framework of the internet applications can be simplified, which can further facilitate to simplify the maintenance complexity of the internet applications. The code of complicated processing logic for implementing the internet applications can be encapsulated into code files. The backstage server can directly use these code files for implementing the complicated processing logic by loading a calling-mode. This decreases development threshold of the backstage server of the internet application; improves development efficiency; decreases operation and maintenance cost; increases production efficiency of the internet application, and performs version iteration according to a rapid response of the market.

Various embodiments also provide a computer storage medium. The computer storage medium may store a program. Execution of the program includes some or all of the steps of the exemplary methods for implementing internet applications as disclosed herein.

The term "code", as used herein, may include software, firmware, and/or microcode, and may refer to programs, routines, functions, classes, and/or objects.

The modules included herein are described according to their functional logic, but are not limited to the above descriptions as long as the modules can implement corresponding functions. Further, the specific name of each functional module is used for distinguishing from on another without limiting the protection scope of the present disclosure. In various embodiments, the disclosed modules can be configured in one apparatus or configured in multiple apparatus as desired. The modules disclosed herein can be integrated in one module or in multiple modules. Each of the modules disclosed herein can be divided into one or more sub-modules, which can be recombined in any manner.

Note that suitable software and/or hardware (e.g., a universal hardware platform) may be included and used in the disclosed methods and systems. For example, the disclosed embodiments can be implemented by hardware only, which alternatively can be implemented by software products only. The software products can be stored in a computer-readable storage medium including, e.g., ROM/RAM, magnetic disk, optical disk, etc. The software products can include suitable commands to enable a terminal device (e.g., including a mobile phone, a personal computer, a server, or a network device, etc.) to implement the disclosed embodiments.

The term "comprising", "including" or any other variants thereof are intended to cover a non-exclusive inclusion, such that the process, method, article, or apparatus containing a number of elements also include not only those elements, but also other elements that are not expressly listed; or further include inherent elements of the process, method, article or apparatus. Without further restrictions, the statement "includes a . . . " does not exclude other elements included in the process, method, article, or apparatus having those elements.

The terminology used in the description of the invention herein is for the purpose of describing particular examples only and is not intended to be limiting of the invention. As used in the description of the invention and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

The terminology used in the description of the invention herein is for the purpose of describing particular examples only and is not intended to be limiting of the invention. As used in the description of the invention and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items.

The embodiments disclosed herein are exemplary only. The order by which the foregoing examples of the present disclosure are presented merely reflects the convenience of description. It does not imply the preference among the examples. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

Methods, network architectures, apparatus (e.g., servers), and communication systems for implementing an internet application are disclosed. For example, a number N of code files of a processing logic used for implementing a first internet application can be loaded in a memory and compiled into a runtime library. The runtime library can be registered to the first internet application. A message data package can be received from an internet application client and parsed to obtain an internet application identification. When the internet application identification indicates that the message data package corresponds to the first internet application, a corresponding function in the runtime library of the first internet application can be called to process the message data package, according to a message identification contained in the message data package.

Because the code of the processing logic for implementing the first internet application is encapsulated into N code files, the code files of the same processing logic can be repeatedly used for implementing different internet applications. In addition, the code framework of the internet applications can be simplified, which can further facilitate to simplify maintenance complexity of the internet applications. The code of complicated processing logic for implementing the internet applications can be encapsulated into code files. The backstage server can directly use these code files for implementing the complicated processing logic by loading a calling-mode. This decreases development threshold of the backstage server of the internet application; improves development efficiency; decreases operation and maintenance cost; increases production efficiency of the internet application, and performs version iteration according to a rapid response of the market.

What is claimed is:

1. A method for implementing an internet application on a server, performed by executable software instructions on one or more hardware processors, comprising:
    loading N code files of a processing logic used for implementing a first internet application in a memory, wherein N is a positive integer;
    compiling the N code files loaded in the memory into a first runtime library;
    registering the first runtime library to the first internet application, wherein the N code files of the same processing logic are compiled into a second runtime library registered to a second internet application;
    receiving a message data package from an internet application client;
    parsing the message data package to obtain an internet application identification contained in the message data package;
    calling a corresponding function in the first runtime library of the first internet application to process the message data package, according to a message identification contained in the message data package, when the internet application identification indicates that the message data package corresponds to the first internet application; and
    calling a corresponding function in the second runtime library of the second internet application to process the message data package, according to the message identification contained in the message data package, when the internet application identification indicates that the message data package corresponds to the second internet application.

2. The method of claim 1, further comprising:
    obtaining processing results after processing the message data package by the corresponding function in the first runtime library of the first internet application;
    feeding back the processing results to the internet application client;
    persisting the processing results to a local cache.

3. The method of claim 2, wherein the message data package contains a user identification, and before calling the corresponding function, the method further comprises:
    searching in the local cache whether there are user data corresponding to the user identification, according to the user identification; and
    reading the user data corresponding to the user identification from a backstage database to the local cache, when the user data corresponding to the user identification are not found in the local cache.

4. The method of claim 1, wherein the message identification contained in the message data package is an internet application logout identification, and wherein calling the corresponding function in the first runtime library further comprises:
    calling the corresponding function in the first runtime library to persist user data corresponding to a user identification recorded in a local cache to a backstage database, according to the internet application logout identification contained in the message data package.

5. The method of claim 4, wherein the N code files comprises JavaScript files.

6. The method of claim 1, wherein the first internet application comprises a first on-line game application, and the second internet application is an application different from the first on-line game application.

7. The method of claim 1, wherein:
    the N code files of the processing logic are used for implementing generic functions of internet applications hosted on the server, the generic functions including: a function for handling user login, a function for handling user logout, a function for reading user data, and a function for writing and saving user data.

8. The method of claim 1, further comprising:
    writing a path for the N code files of the processing logic used for implementing the first internet application into a configuration file; and
    according to the path information recorded in the configure file, loading the N code files of the processing logic used for implementing the first internet application in the memory.

9. The method of claim 8, further comprising:
    writing the path for the N code files of the processing logic used for implementing the second internet application into the configuration file; and
    according to the path information recorded in the configure file, loading the N code files of the processing logic used for implementing the second internet application in the memory.

10. An apparatus for implementing an internet application, comprising:
    one or more hardware processors configured to execute:
    a runtime library implementing unit, configured to load N code files of a processing logic used for implementing a first internet application in a memory, wherein N is a positive integer, to compile the N code files loaded in the memory into a first runtime library, and to register the first runtime library to the first internet application, wherein the N code files of the same processing logic are compiled into a second runtime library registered to a second internet application;
    a receiving unit, configured to receive a message data package from an internet application client;
    a parsing unit, configured to parse the message data package to obtain an internet application identification contained in the message data package; and
    a calling unit, configured to:
        call a corresponding function in the first runtime library of the first internet application to process the message data package, according to a message identification contained in the message data package, when the internet application identification indicates that the message data package corresponds to the first internet application; and
        call a corresponding function in the second runtime library of the second internet application to process the message data package, according to the message identification contained in the message data package, when the internet application identification indicates that the message data package corresponds to the second internet application.

11. The apparatus of claim 10, wherein the one or more hardware processors are further configured to execute:
    a result obtaining unit, configured to obtain processing results after processing the message data package by the corresponding function in the first runtime library of the first internet application; and
    a result processing unit, configured to feed back the processing results to the internet application client, and/or persist the processing results to a local cache.

12. The apparatus of claim 11, wherein the message data package contains a user identification, and the one or more processors are further configured to execute a data reading unit configured, before calling the corresponding function in the first runtime library to process the message data package, to search in the local cache whether there are user data corresponding to the user identification according to the user identification; and to read the user data corresponding to the user identification from a backstage database to the local cache, when the user data corresponding to the user identification are not found in the local cache.

13. The apparatus of claim 12, wherein the N code files comprises JavaScript files.

14. The apparatus of claim 10, wherein the message identification contained in the message data package is an internet application logout identification, and wherein the calling unit is further configured to call the corresponding function in the first runtime library to persist user data corresponding to a user identification recorded in a local cache to a backstage database, according to the internet application logout identification contained in the message data package.

15. A communication system, comprising:
an access server and an internet application server,
wherein the access server and the internet application server communicate with each other;
wherein the access server, having one or more hardware processors executing software instructions, is configured to receive a message data package from an internet application client and to forward the message data package to the internet application server; and
wherein the internet application server, having software instructions executed by one or more hardware processors, is configured to load N code files of a processing logic used for implementing a first internet application in a memory, wherein N is a positive integer;
to compile the N code files loaded in the memory into a first runtime library of the first internet application;
to register the first runtime library to the first internet application, wherein the N code files of the same processing logic are compiled into a second runtime library registered to a second internet application;
to receive a message data package from an internet application client; to parse the message data package to obtain an internet application identification contained in the message data package;
to call a corresponding function in the first runtime library of the first internet application to process the message data package, according to a message identification contained in the message data package, when the internet application identification indicates that the message data package corresponds to the first internet application; and
to call a corresponding function in the second runtime library of the second internet application to process the message data package, according to the message identification contained in the message data package, when the internet application identification indicates that the message data package corresponds to the second internet application.

16. The communication system of claim 15, wherein the internet application server is further configured to:
obtain processing results after processing the message data package by the corresponding function in the first runtime library of the first internet application;
feed back the processing results to the internet application client; and
persist the processing results to a local cache.

17. The communication system of claim 16, wherein the message data package contains a user identification, and before calling the corresponding function, the internet application server is further configured to:
search in the local cache whether there are user data corresponding to the user identification, according to the user identification; and
read the user data corresponding to the user identification from a backstage database to the local cache, when the user data corresponding to the user identification are not found in the local cache.

18. The communication system of claim 15, wherein the message identification contained in the message data package is an internet application logout identification and, to call the corresponding function in the first runtime library, the internet application server is further configured to:
call the corresponding function in the first runtime library to persist user data corresponding to a user identification recorded in a local cache to a backstage database, according to the internet application logout identification contained in the message data package.

19. The communication system of claim 18, wherein the N code files comprises JavaScript files.

20. The communication system of claim 15, wherein the first internet application comprises a first on-line game application, and the second internet application is an application different from the first on-line game application.

* * * * *